ns
3,334,013
SUBSTITUTED 17β-ANDROST-4-EN-3-ONE AND 19-NORANDROST-4-EN-3-ONE AND METHOD OF PREPARING THE SAME
Edward W. Cantrall, Pearl River, N.Y., Joseph P. Joseph, Cliffside Park, N.J., and Seymour Bernstein, New City, N.Y., assignors to American Cyanamid Company, Stamford, Conn., a corporation of Maine
No Drawing. Filed Oct. 31, 1962, Ser. No. 234,553
17 Claims. (Cl. 167—65)

This invention relates to new steroid compounds. More particularly, it relates to 17β-(ω-diloweralkylaminoalkoxy)-androst-4-en-3-ones and hydrohalide salts thereof, and their preparation.

The new steroids of the present invention can be illustrated by the following formula:

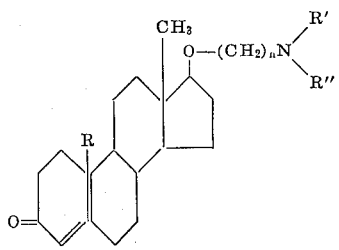

in which R is a member of the group consisting of hydrogen and lower alkyl radicals and R' and R'' are lower alkyl radicals and $n$ is an integer from 2 to 4.

The novel compounds of the present invention are white crystalline solids. They are relatively insoluble in water but soluble in organic solvents such as methanol, ethanol, ethyl acetate, acetone and the like.

The new steroids of the present invention are prepared from 3-ethylenedioxyandrost-5-en-17β-ol. The starting material is reacted with ω-diloweralkylaminoethyl, propyl or butyl chloride in the presence of potassium tertiary butoxide. The reaction mixture is heated for a period of from 10 minutes to 3 hours at a temperature within the range of 60° to 120° C. The desired product is extracted with a solvent such as ether and precipitated with an acid chloride such as hydrogen chloride. The product is further purified by neutralization and subsequent crystallization.

The steroids of the present invention can be dispensed as the active ingredient in compositions containing the steroid and an edible carrier. While the amount of steroid to be given daily will depend on many factors such as size, weight, age, etc. of the warm blooded animal, it has been found that a daily intake from 50 mg. to 250 mg. will produce good results. The dosage unit may be in a form for a single unit per day or smaller forms for use as multiple units per day. In the case of tablets they may be of larger size, scored for use as fractional units one or more times per day.

The compositions can be dispensed in the form of soft and hard shelled gelatin capsules. Also present in the capsules may be diluents such as lactose, starch, magnesium oxide, magnesium stearate and the like. The capsules may be large enough to provide the desirable daily dosage or smaller to be used in multiple doses per pay.

The present steroid compositions may be dispensed as parenteral solutions or suspensions. If larger doses in smaller amounts are desirable it may be necessary to use parenteral suspensions because the solubility of the steroids in substantially aqueous solutions is limited.

The present steroid compositions may be in the form of syrups or pediatric drops. Such formulations usually contain one or more of the following suspending agents, buffer salts, stabilizers, preservatives, etc.

The compounds of the present invention are effective in lowering blood cholesterol in rats and therefore may be useful in the treatment of hypercholesteremia. They show little, if any, androgenic activity and consequently display little, if any, virilizing effects.

The following examples describe in detail the preparation of steroids of the present invention and their use in pharmaceutical formulations.

EXAMPLE 1

3-ethylenedioxyandrost-5-en-17β-ol 3-ethylenedioxyandrost-5-en-17β-ol acetate (20.0 g.) is dissolved in 400 ml. of 2.5% potassium hydroxide in methanol. The resulting solution is heated to reflux for one hour, poured into ice water, and the product is collected by filtration. The crude product is dissolved in methylene chloride, washed with water and evaporated to give 17.3 g., melting point 184–185° C.

EXAMPLE 2

17β-(β-dimethylaminoethoxy)androst-4-en-3-one

A solution containing 10.0 g. of 3-ethylenedioxyandrost-5-en-17β-ol and 4.3 g. of potassium t-butoxide in 300 ml. of freshly distilled tetrahydrofuran is heated to reflux with rapid mechanical stirring under a nitrogen atmosphere for one hour. β-Dimethylaminoethyl chloride (9.0 ml.) is added and reflux is continued for two hours. Another portion each of β-dimethylaminoethyl chloride (9.0 ml.) and potassium t-butoxide (4.3 g.) are added and the resulting mixture is refluxed for two hours, cooled, filtered and evaporated. The residue is extracted with ether and the product is precipitated with hydrogen chloride. The resulting precipitate contains some starting material in addition to product and is partially dissolved in water and filtered. The filtrate is acidified with 1 N hydrochloric acid and allowed to stand at room temperature for one hour and is then made basic with 1 N sodium hydroxide. The product is extracted into ether and the extract is washed with water, dried over anhydrous magnesium sulfate and evaporated to give 470 mg., melting point 68–71° C. The crude product is dissolved in ether, decolorized with charcoal, filtered and evaporated to give colorless crystals, melting point 68–71° C., $$\lambda_{max.}^{MeOH}\ 240\ m\mu\ (\epsilon\ 14{,}700)$$

EXAMPLE 3

Following the procedure of Example 2 and substituting β-diethylaminoethyl chloride in place of β-dimethylaminoethyl chloride, the product obtained is 17β-(β-diethylaminoethoxy)-androst-4-en-3-one.

EXAMPLE 4

Following the procedure of Example 2 and substituting γ-dimethylaminopropyl chloride in place of β-dimethylaminoethyl chloride, the product obtained is 17β-(γ-dimethylaminopropoxy)-androst-4-en-3-one.

EXAMPLE 5

Following the procedure of Example 2 and substituting the 3-ethylene ketal of 19-nortestosterone [J. Am. Chem. Soc. 81, 3120 (1959)] in place of the 3-ethylene ketal of testosterone, the product obtained is 17β-(β-dimethylaminoethoxy)-19-norandrost-4-en-3-one.

EXAMPLE 6

17β - (β-dimethylaminoethoxy)-androst-4-en-3-one is dissolved in ether, and hydrogen chloride is passed into the solution. 17β - (β-dimethylaminoethoxy)-androst-4-en-3-one hydrochloride precipitates and is collected by filtration.

EXAMPLE 7

Parenteral solutions of the compounds of the present invention can be used as a method of administration. The following formulation has been found desirable.

|  | Percent w./v. |
| --- | --- |
| 17β-(β-dimethylaminoethoxy)-androst-4-en-3-one | 1.0–2.0 |
| Hydrochloric acid as needed to obtain pH | 3.0–5.0 |
| Sequestrene, disodium | 0.05 |
| Benzyl alcohol, reagent | 1.5 |
| Pyrogen-free distilled water to make 100.0. | |

The pH of the above solution is about 3. In place of hydrochloric acid other acids can be used such as citric, succinic, lactic, maleic, phosphoric and so forth. Preservatives other than benzyl alcohol can also be used such as phenol 0.5%, chlorobutanol, parabens 0.2% etc. Other stabilizers in place of sequestrene disodium such as sequestrene bisulfite, sequestrene monothioglycerol etc. can be used.

EXAMPLE 8

The compounds of the present invention can be given in larger amounts parenterally in the form of parenteral suspensions such as the following.

|  | Percent w./v. |
| --- | --- |
| 17β-(β-diethylaminoethoxy)-androst-4-en-3-one | 2.0–30.0 |
| Polyoxyethylene sorbitan monooleate | 0.1–0.2 |
| Polyethylene glycol, 4000 | 2.0–5.0 |
| Sodium chloride, USP | 0.5–0.8 |
| Sequestrene, disodium | 0.05 |
| Sodium sulfite | 0.2 |
| Benzyl alcohol | 0.9 |
| Pyrogen-free distilled water to make 100.0. | |

The above suspension has a pH of about 8 to 9. Obviously, other ingredients can be used in place of the above to prepare desired suspensions. For example, as surfactants in place of polyoxyethylene sorbitan monooleate we can use ethylene oxide of polyoxypropylene base and so forth. Other suspending agents such as carboxymethyl cellulose, methyl cellulose and gelatin can be used. Buffer salts other than sodium chloride can be used such as sodium phosphates, triethanolamines, etc. Also, stabilizers other than sodium sulfite and sequestrene can be used such as monothioglycerol, sodium formaldehyde sulfoxylate and the like. While benzyl alcohol is a desirable preservative, others can be used such as parabens, chlorobutanol, etc. Also, in place of polyethylene glycol 4000 other vehicles can be used such as polyethylene glycol 400.

EXAMPLE 9

The present compounds can be dispensed in dosage unit forms such as hard shell capsules or soft shell capsules. A formulation found useful in the preparation of such capsules is as follows.

|  | Per 100 capsules, grams |
| --- | --- |
| 17β-(β-dimethylaminoethoxy)-androst-4-en-3-one | 12.50 |
| Lactose, USP | 12.50 |
| Magnesium stearate (0.5%) | 0.125 |
| Total | 25.125 |

The above formulation is thoroughly mixed and placed as equal quantities in 100 capsules.

EXAMPLE 10

In the above formulation, Example 9, 17β-(γ-dimethylaminopropoxy)-androst-4-en-3-one is substituted for 17β-(β-dimethylaminoethoxy)-androst-4-en-3-one.

EXAMPLE 11

In the above formulation, Example 9, 17β-(β-dimethylaminoethoxy)-19-norandrost-4-en-3-one is substituted for 17β-(β-dimethylaminoethoxy)-androst-4-en-3-one.

EXAMPLE 12

The various compounds of the present invention can also be given in the form of tablets containing other ingredients as follows.

|  | Per tablet, grams |
| --- | --- |
| 17β-(β-diethylaminoethoxy)-androst-4-en-3-one | 0.125 |
| Corn starch | 0.30 |
| Ethyl cellulose N 10 | 0.005 |
| Magnesium stearate 1% | 0.0016 |
| Total | 0.1616 |

The above formulation can be varied by increasing or decreasing the corn starch and by the addition of other ingredients. Also in place of corn starch other disintegrating agents can be used such as potato starch. Other lubricants such as stearic acid, talc and the like can be used. Sweetening agents such as saccharin or sodium cyclohexyl sulfamate and flavoring such as pepermint oil, oil of wintergreen, orange or cherry can be used.

We claim:

1. A compound selected from the group consisting of those of the formula:

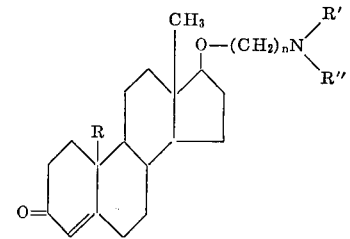

in which R is a member of the group consisting of hydrogen and methyl and R' and R" are lower alkyl radicals and $n$ is an integer from 2 to 4 and hydrochloride salts.

2. The compound 17β-(β-dimethylaminoethoxy)-androst-4-en-3-one.

3. The compound 17β-(β-diethylaminoethoxy)-androst-4-en-3-one.

4. The compound 17β-(γ-dimethylaminopropoxy)-androst-4-en-3-one.

5. The compound 17β-(β-dimethylaminoethoxy)-19-norandrost-4-en-3-one.

6. The compound 17β-(β-dimethylaminoethoxy)-androst-4-en-3-one hydrochloride.

7. A composition of matter adapted for treating hypercholesteremia containing as an essential active ingredient a steroid of the formula:

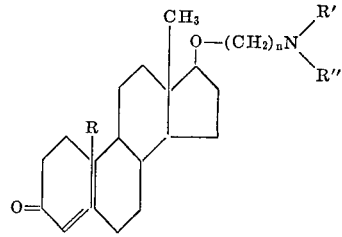

in which R is a member of the group consisting of hydrogen and methyl and R' and R" are lower alkyl radicals and $n$ is an integer from 2 to 4 and hydrochloride salts thereof, said active ingredient being present in conjunction with a pharmaceutical carrier that is chemically inert with respect to said active ingredient and being in dosage unit form.

8. A composition of matter as defined in claim 7 in which the steroid is 17β-(β-dimethylaminoethoxy)-androst-4-en-3-one.

9. A composition of matter as defined in claim 7 in which the steroid is 17β-(β-diethylaminoethoxy)-androst-4-en-3-one.

10. A composition of matter as defined in claim 7 in which the steroid is 17β-(γ-dimethylaminopropoxy)-androst-4-en-3-one.

11. A composition of matter as defined in claim 7 in which the steroid is 17β-(β-dimethylaminoethoxy)-19-nortestosterone-4-en-3-one.

12. A method for treating hypercholesteremia which comprises administering a composition containing as an essential active ingredient a steroid of the formula:

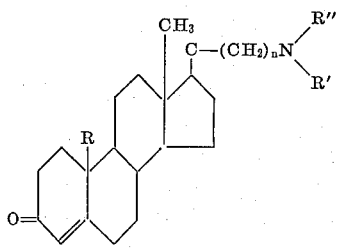

in which R is a member of the group consisting of hydrogen and methyl and R' and R" are lower alkyl radicals and *n* is an integer from 2 to 4 and hydrochloride salts thereof, said administration being in an amount sufficient to lower blood cholesterol content.

13. A method according to claim 12 in which the active ingredient is 17β-(β-dimethylaminoethoxy)-androst-4-en-3-one.

14. A method according to claim 12 in which the active ingredient is 17β-(β-diethylaminoethoxy)-androst-4-en-3-one.

15. A method according to claim 12 in which the active ingredient is 17β-(γ-dimethylaminopropoxy)-androst-4-en-3-one.

16. A method according to claim 12 in which the active ingredient is 17β - (β-dimethylaminoethoxy)-19-norandrost-4-en-3-one.

17. A compound selected from the group consisting of compounds of the formula:

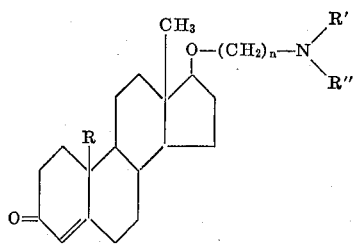

in which R is a member of the group consisting of hydrogen and methyl, R' and R" are lower alkyl and *n* is an integer from 2 to 3.

No references cited.

LEWIS GOTTS, *Primary Examiner.*

IRVIN MARCUS, *Examiner.*

JOHNIE R. BROWN, J. R. GENTRY,
HENRY FRENCH, *Assistant Examiners.*